United States Patent [19]

Stephens

[11] 3,925,253

[45] Dec. 9, 1975

[54] CATALYSTS

[75] Inventor: Ruth E. Stephens, Royal Oak, Mich.

[73] Assignee: Ethyl Corporation, Richmond, Va.

[22] Filed: Mar. 19, 1973

[21] Appl. No.: 342,787

[52] U.S. Cl.............. 252/455 R; 252/454; 252/462; 252/463; 423/213
[51] Int. Cl................................................ B01j 29/06
[58] Field of Search........ 252/455 R, 454, 462, 463; 423/213

[56] References Cited
UNITED STATES PATENTS

| | | | |
|---|---|---|---|
| 3,226,340 | 12/1965 | Stephens et al............. | 252/455 R X |
| 3,252,757 | 5/1966 | Granquist................... | 252/455 R X |
| 3,252,889 | 5/1966 | Capell et al................ | 252/455 R X |
| 3,284,370 | 11/1966 | Clifford et al. ............. | 252/462 |
| 3,483,136 | 12/1969 | van der Plas et al. ...... | 252/462 UX |
| 3,483,138 | 12/1969 | Stephens.................... | 252/462 |
| 3,617,488 | 11/1971 | Csicsery ................... | 252/455 R UX |
| 3,632,502 | 1/1972 | Kittrell...................... | 252/455 R X |
| 3,664,971 | 5/1972 | Jaffe.......................... | 252/455 R |
| 3,664,972 | 5/1972 | Jaffe.......................... | 252/455 R |
| 3,776,859 | 12/1973 | Simpson..................... | 252/462 |

*Primary Examiner*—Paul F. Shaver
*Attorney, Agent, or Firm*—Donald L. Johnson; Robert A. Linn; Joseph D. Odenweller

[57] ABSTRACT

Disclosed herein is an attrition resistant catalyst support comprising a carrier such as alumina coated with a silica coating which contains a rare earth metal oxide, and optionally alumina, such that the atom ratio of rare earth metal to silicon to aluminum in the coating is 1:0.1–2.0:0–20. A catalytic metal oxide such as copper oxide or manganese oxide may be included in the coating or added later in an amount such that the atom ratio of catalytic metal to rare earth metal to silicon to aluminum in the coating is 0.6–1.5:1:0.1–2.0:0–20. The final catalyst may be promoted with a small amount of a noble metal such as palladium to improve low temperature activity.

20 Claims, No Drawings

CATALYSTS

BACKGROUND

In the past, catalysts have been supported on such materials as alumina, silica, silica-alumina, silica-alumina-magnesia, and the like. Such supports generally result in a catalyst having good activity. However, it has been found that such catalysts tend to crumble and abrade when subject to thermal and physical shock such as encountered in a pulsating exhaust gas stream. As soon as a small amount of the catalyst is lost from the catalyst bed by attrition the remaining catalyst becomes loosely packed and transforms into a fluid bed. Under such conditions, it is not unusual for the entire catalyst to disintegrate and be blown out the exhaust pipe in a few thousand miles.

One of the objects of the present invention is to provide attrition resistant catalyst supports which have a coating of silica containing a rare earth metal oxide, and optionally alumina.

Other attempts to stabilize catalyst supports such as alumina have been made. In U.S. Pat. No. 3,291,564, potassium, cesium and barium are used to stabilize alumina. In British Pat. No. 1,231,276, potassium, calcium and barium are used in alumina compositions. Alumina containing rare earth metal oxides are disclosed in U.S. Pat. No. 3,483,138 and U.S. Pat. No. 3,545,917. Laminar catalysts having an alumina core, a lanthanum series metal oxide lamina and an outer layer of copper oxide are disclosed in U.S. Pat. No. 3,226,340. Other patents relating to rare earth metal containing catalysts are U.S. Pat. Nos. 3,453,333; 3,395,004; 3,284,370; 3,153,635; 2,945,057; 2,152,908; 2,148,129 and 2,129,733.

SUMMARY OF THE INVENTION

According to the present invention, attrition resistant catalyst supports are provided consisting essentially of a catalyst carrier coated or impregnated with a silica coating containing a rare earth metal oxide, and optionally alumina. Excellent catalysts can be made from such supports by including a catalytic metal in the silica coating or by applying such catalytic metal to the finished support. The catalysts are very effective in treating exhaust gas from internal combustion engines.

DESCRIPTION OF THE PREFERRED EMBODIMENTS

One preferred embodiment of the invention is a catalyst support consisting essentially of a carrier coated with a silica coating, said silica coating containing a rare earth metal oxide and optionally alumina, the atom ratio of rare earth metal to silicon to aluminum in said coating being 1:0.1–2.0:0–20.

Suitable carriers include all those materials conventionally used as catalyst supports such as alumina, silica, silica-alumina, silica-magnesia-alumina, zirconia, magnesia, wire mesh, mullite, cordierite, and various ceramics such as the honeycomb structured monolithic ceramics described in U.S. Pat. No. 3,444,925. Especially useful carriers are the aluminas frequently used as catalyst supports such as transitional aluminas. Such aluminas are commercially available (Alcoa F-1 alumina, Kaiser KA-101 alumina).

The coating is most readily applied by preparing an aqueous solution or sol of the components of the coating in the desired atom ratio and impregnating the carrier with this solution or sol. Multiple impregnations can be employed with a drying step in between to obtain a heavier coating.

The rare earth metals are used in the form of their salts such as their nitrates and acetates, which are decomposable to an oxide form. Rare earth metals are those having an atomic number from 57–71. The most preferred are lanthanum, praseodymium and neodymium, and mixtures consisting mainly of these materials. Such mixtures are termed "didymium" salts such as didymium nitrate. These mixtures are commercially available and, in terms of their equivalent oxides, analyze about 45 percent lanthanum oxide, 32 percent neodymium oxide, 9 percent praseodymium oxide, 1 percent cesium oxide, and the balance mainly samarium oxide and gadolinium oxide. Of the individual rare earth metals, lanthanum is most useful.

A useful form of silica for preparing the coatings is a finely-divided silica. Such silicas are commercially available such as "Cab-O-Sil" (Cabot Corporation).

Aluminum is preferably included in the solution in the form of a soluble aluminum salt decomposable by heat to an oxide. Examples of such salts are aluminum nitrate and aluminum acetate.

The aqueous mixture is prepared such that the atom ratio of rare metal to silicon to aluminum is about 1:0.1–2:0–20. A more preferred ratio is 1:0.6–1.4:0–20, and a most preferred ratio is 1:0.6–1.4:2–10. Exceptionally good results are obtained when the atom ratio of rare earth metal to silicon is about 1:1. When alumina is included in the coating the most preferred atom ratio of rare earth metal to silicon to aluminum is about 1:1:4.

The following examples illustrate the methods by which the present supports and catalysts can be prepared.

EXAMPLE 1

In an impregnating vessel was placed 100 grams of an aqueous solution containing 35.5 grams of hydrated aluminum nitrate. To this was added 7.2 grams of lanthanum acetate and 1 gram of finely-divided silica (Cab-O-Sil). After stirring for several minutes the mixture was poured into a vessel containing 200 grams of an activated alumina. After substantially all the liquid had been absorbed the remaining water was evaporated by blowing with hot air and the resultant support dried and heated on a hotplate. It was then placed in an oven and heated slowly to 600°C. and maintained at this temperature for one hour. The product was an attrition resistant support suitable for impregnation with a variety of catalytic metal salts such as copper nitrate, manganese nitrate, and the like.

EXAMPLE 2

In a mixing vessel was placed 200 grams of didymium nitrate hexahydrate and 30 grams of finely-divided silica. The mixture was diluted to 750 ml with water and warmed and stirred for 3 hours. It was then diluted to 850 ml. A 400 ml portion was poured into a vessel containing one liter of 5–8 mesh alumina (Alcoa F-1) and the mixture stirred and the residual water evaporated using a hot air blow. It was then heated slowly to 600°C. and cooled. It was then impregnated with the remaining 450 ml of solution, dried, and heated to 850°C. as before, giving a rare earth metal silica coated alumina support.

Another embodiment of the invention is an attrition resistant exhaust gas catalyst consisting essentially of a carrier coated with a silica coating and a catalytic metal oxide, said silica coating containing a rare earth metal oxide, and optionally alumina, in an amount such that the atom ratio of rare earth metal to silicon to aluminum is 1:0.6–1.4:0–20 and the amount of catalytic metal oxide is such that the atom ratio of catalytic metal to rare earth metal is about 0.6–1.5:1.

A more preferred atom ratio of catalytic metal to rare earth metal to silicon to aluminum is 0.6–1.5:1:0–.6–1.4:2–10. The carrier can be any of the materials normally used as catalyst supports such as alumina, silica-alumina, silica-magnesia-alumina, magnesia alumina, zirconia, and the like. The preferred carrier is alumina.

These catalysts can be made by impregnating the previously-described supports with an aqueous solution of a catalytic metal salt which is thermally decomposable to an oxide form. In another embodiment the catalytic metal salt is included in the silica coating mixture initially applied to the carrier. In both cases, the amount of catalytic metal is adjusted to give the desired atom ratio.

Useful catalytic metals include all those conventionally used to prepare exhaust gas oxidation and reduction catalysts, such as V, Cr, Mn, Fe, Co, Ni, Cu, Mo, Ru, Rh, Pd, Ag, Os, Ir, Pt, and the like. Preferred metals are the metals of Groups V-B, VI-B, VII-B, VIII and I-B. The most preferred catalytic metals are copper and manganese, which may optionally be promoted with a small amount (e.g., 0.005–0.3 weight percent based on the weight of the catalyst) of an noble metal such as palladium.

The rare earth metal oxide, silica and alumina are incorporated into the coating using the same materials and method described for preparing the attrition resistant supports. The following examples illustrate methods by which the catalysts can be prepared.

EXAMPLE 3

In a mixing vessel was placed 300 grams of aluminum nitrate, 87 grams of didymium nitrate and 48 grams of cupric nitrate. To this was added 700 ml of water and the mixture stirred to form a solution. Then 12 grams of finely-divided silica was added while stirring. The mixture was poured over two quarts (about 1800 grams) of 5–8 mesh activated alumina. The impregnated alumina was air dried and then heated on a hotplate to decompose the metal salts to their oxide form. The alumina was then placed in an oven and heated slowly to 600°C. and held at this temperature for one hour. This resulted in an attrition resistant silica coated alumina supported catalyst in which the atom ratio in the support of copper to rare earth to silicon to aluminum was 1:1:1:4.

Low temperature activity of the above catalyst can be improved by impregnating it with an aqueous palladium chloride solution sufficient to provide about 0.1 weight percent palladium based on the catalyst. Following this impregnation the catalyst is dried and heated to 600°C. to form a palladium-promoted copper catalyst of this invention.

EXAMPLE 4

The above example is repeated using 35.8 grams of manganese nitrate in place of the copper nitrate to form a catalyst in which the coating ratio of manganese to rare earth metal to silicon to aluminum is 1:1:1:7.

This catalyst can be impregnated further with palladium in the same manner as in the previous example to give a palladium-promoted manganese catalyst having improved low temperature activity.

EXAMPLE 5

In a mixing vessel was placed 300 grams of aluminum nitrate, 12 grams of finely-divided silica, 87.2 grams of didymium nitrate hexahydrate and sufficient water to make 400 ml of solution. This gave a mixture having a rare earth metal:silicon:aluminum atom ratio of 1:1:4.

A 25 ml aliquot of the above was placed in a separate vessel and 3 grams of cupric nitrate added to it to give a solution having a copper:rare earth metal:silicon:aluminum atom ratio of 1:1:1:4. A 10 ml portion of activated alumina was impregnated with 5 ml of the final solution. It was then dried, decomposed on a hotplate, and heated to 600°C., resulting in an effective catalyst.

EXAMPLE 6

The above example was repeated using 1.5 grams of cupric nitrate and 2.5 grams of chromic nitrate in place of the 3 grams of cupric nitrate.

EXAMPLE 7

The above Example 5 was repeated using 1.5 grams cupric nitrate and 1.53 grams manganese acetate in place of the 3 grams of cupric nitrate, giving a catalyst in which the coating had a Cu—Mn:rare earth metal:Si:Al atom ratio of 1:1:1:4.

EXAMPLE 8

The above Example 5 was repeated using 2.5 grams ferric nitrate and 1.5 grams cupric nitrate in place of the 3 grams of cupric nitrate, resulting in a copper:iron:rare earth metal:silica alumina coated catalyst.

EXAMPLE 9

The above Example 5 was repeated using 1.5 grams cupric nitrate and 1.875 grams cobaltous nitrate in place of the 3 grams of cupric nitrate, giving a coated catalyst of this invention in which the coating contained copper and cobalt as the catalytic metals.

EXAMPLE 10

The above Example 5 was repeated using 1.5 grams of copper nitrate and 1.8 grams of nickelous nitrate in place of the 3 grams of cupric nitrate, to give a coated catalyst of this invention in which the coating contained copper and nickel as the catalytic metals.

EXAMPLE 11

In a mixing vessel was placed 28.7 grams hydrated manganese nitrate in the form of a commercial 50 percent solution, 300 grams of aluminum nitrate hydrate, 34 grams of lanthanum acetate, 6 grams of finely-divided silica and 1.4 grams palladium chloride. The mixture was diluted to 300 ml with water and stirred. Then, one quart (appx. 900 grams) of activated alumina was added and the mixture stirred until absorption was complete. Residual moisture was removed using a hot air blow and the pellets were then dried. The dried pellets were heated on a hotplate to decompose metal salts to their oxide form and finally heated to 600°C. in an oven and held at this temperature for one hour. This gave a catalyst in which the coating had an atom ratio of manganese:lanthanum:silicon:aluminum of 1:1:1:8 and which contained a small amount of palladium as a low temperature promoter.

EXAMPLE 12

In a mixing vessel was placed 600 grams aluminum nitrate hydrate, 136 grams lanthanum acetate, 100 ml 50 percent manganese nitrate solution, 24 grams finely-divided silica and water sufficient to make 750 ml of solution. The mixture was stirred and then added to 2 liters of activated 5–8 mesh alumina. The resultant catalyst was dried and calcined to 600°C. for one hour. It was then cooled and impregnated with an aqueous solution containing 1.4 grams palladium chloride, following which it was dried and calcined as before to give a catalyst in which the coating had an atom ratio of manganese:lanthanum:silicon:aluminum of 1:1:1:4 and which contained a small amount of a palladium promoter.

EXAMPLE 13

In a mixing vessel was placed 600 grams hydrated aluminum nitrate, 136 grams lanthanum acetate, 100 grams cupric nitrate hydrate and 24 grams finely-divided silica. The mixture was diluted to 750 ml with water and, after stirring, poured into 2 liters of 5–8 mesh alumina. The impregnated alumina was air blown and calcined to 600°C. for one hour and then cooled. It was then impregnated with a 700 ml solution containing 2.8 grams of palladium chloride, following which it was again dried and calcined as before. This gave a catalyst in which the coating had a copper:lanthanum:silicon:aluminum atom ratio of 1:1:1:4.

EXAMPLE 14

In a mixing vessel was placed 300 grams aluminum nitrate, 46 grams lanthanum acetate, 32 grams cupric nitrate hydrate and 8 grams finely-divided silica. Water was added to make 600 ml and the mixture stirred. A 300 ml portion was then poured over one liter 5–8 mesh alumina which was stirred and air blown to dryness. The product was then heated to 600°C. for one hour and cooled. To the remaining 300 ml of solution was added a 50 ml aqueous solution containing 1.3 grams palladium chloride. The catalyst was then impregnated with this solution, dried, and calcined to 600°C. as before, giving an effective catalyst of this invention.

Engine tests were carried out to demonstrate the high effectiveness of the present catalysts. In these tests, a 36 CID single cylinder engine was operated and the exhaust gas passed through dual parallel 42 cubic inch catalytic containers. The engine was operated on a cycle in which it idled 50 seconds and then ran at wide open throttle 150 seconds.

| ENGINE OPERATING CONDITIONS | Idle | WOT |
|---|---|---|
| Engine speed | 800 | 1340 |
| Exhaust CO (%) | 5 | 3 |
| Air added (SCFM) | 0 | 1 |

The exhaust hydrocarbon and carbon monoxide content was measured at wide open throttle operation, both before and after the catalyst bed. The test was carried out using the catalysts described in Examples 12 and 13. Results are given in the following table in terms of the percent reduction of hydrocarbon and carbon monoxide as the test proceeded.

| Test Hours | Percent Reduction | | | |
|---|---|---|---|---|
| | Example 12 | | Example 13 | |
| | HC | CO | HC | CO |
| 1.5 | 75 | 89.3 | 81.3 | 96.7 |
| 25.1 | 66.7 | 81.7 | 85.7 | 92.8 |
| 46.4 | 72.7 | 84.0 | 81.8 | 93.7 |
| 71.4 | 65.4 | 76.0 | 69.2 | 88.0 |
| 94.3 | 66.7 | 79.4 | 76.2 | 87.3 |

Further tests were carried out using a typical gasoline containing 12 ml tetraethyllead per gallon. This is many times the amount normally used in gasoline and is used to demonstrate the excellent compatibility of the present catalysts with leaded gasoline. The results obtained using the catalyst described in Example 14 were as follows:

| Hours | % Reduction | |
|---|---|---|
| | HC | CO |
| 1.0 | 85 | 96 |
| 26 | 83.8 | 94 |
| 46 | 78.5 | 91.6 |
| 69 | 72.8 | 91.6 |
| 93 | 75 | 92.6 |

The above results show the excellent lead resistance of the catalysts of the present invention. It can be seen that very little loss in effectiveness in hydrocarbon oxidation occurred and that the CO effectiveness was almost as good at the end of the test as at the beginning.

Following the above described tests, the used catalysts were removed from the catalyst containers and their hardness determined by placing them in a paint can and shaking the can for one hour using a commercial paint shaker. After this time the catalyst was screened to remove fines and the percent weight loss due to physical attrition determined as a measure of hardness or attrition resistance. The results obtained were:

| Catalyst | % Attrition Loss |
|---|---|
| Example 12 | 6.0 |
| Example 13 | 6.5 |
| Example 14 | 4.1 |

For comparison, a similar alumina supported copper-palladium catalyst not containing the silica aluminum rare earth metal coating exhibits an attrition loss of about 14.5 percent after this same test. Thus, the present invention provides catalysts which are not only highly effective even in the presence of lead but which have very good attrition resistance.

I claim:

1. A catalyst support resistant to loss by attrition consisting essentially of a carrier coated with a silica coating, said silica coating containing a rare earth metal oxide and optionally alumina dispersed throughout said coating, the atom ratio of rare earth metal to silicon to aluminum in said coating being 1:0.1–2.0:0–20.

2. A catalyst support of claim 1 wherein said coating consists essentially of a silica coating containing a rare earth metal oxide dispersed throughout said coating and wherein said atom ratio of rare earth metal to silicon is 1 to about 0.6–1.4.

3. A catalyst support of claim 2 wherein said ratio is about 1:1.

4. A catalyst support of claim 1 wherein said carrier is an alumina.

5. A catalyst support of claim 4 wherein said rare earth metal is lanthanum.

6. A catalyst support of claim 4 wherein said rare earth metal is a mixture consisting mainly of lanthanum, neodymium and praseodymium.

7. A catalyst support of claim 1 wherein said atom ratio of rare earth metal to silicon to aluminum in said coating is 1:0.1–2.0:2–10.

8. A catalyst support of claim 7 wherein said atom ratio is about 1:0.6–1.4:2–10.

9. A catalyst support of claim 8 wherein said atom ratio is about 1:1:4.

10. An attrition resistant exhaust gas catalyst consisting essentially of a carrier coated with a silica coating and a catalytic metal oxide, said silica coating containing a rare earth metal oxide, and optionally alumina dispersed throughout said coating, in an amount such that the atom ratio of rare earth metal to silicon to aluminum is 1:0.1–2.0:0–20 and the amount of catalytic metal oxide is such that the atom ratio of catalytic metal to rare earth metal is about 0.6–1.5:1.

11. A catalyst of claim 10 wherein the atom ratio of catalytic metal to rare earth metal to silicon to aluminum is about 0.6–1.5:1:0.6–1.4:2–10.

12. A catalyst of claim 11 wherein said carrier is an alumina.

13. A catalyst of claim 12 wherein said catalytic metal oxide is copper oxide.

14. A catalyst of claim 13 wherein said coating contains a promoter amount of palladium.

15. A catalyst of claim 14 wherein said rare earth metal is a mixture of rare earth metals consisting mainly of lanthanum, neodymium and praseodymium.

16. A catalyst of claim 14 wherein said rare earth metal is lanthanum.

17. A catalyst of claim 12 wherein said catalytic metal oxide is manganese oxide.

18. A catalyst of claim 17 wherein said coating contains a promoter amount of palladium.

19. A catalyst of claim 18 wherein said rare earth metal is a mixture of rare earth metals consisting mainly of lanthanum, neodymium and praseodymium.

20. A catalyst of claim 18 wherein said rare earth metal is lanthanum.

* * * * *